United States Patent
Harada et al.

(10) Patent No.: US 9,910,599 B2
(45) Date of Patent: Mar. 6, 2018

(54) CACHE READ-MODIFY-WRITE PROCESS CONTROL BASED ON MONITORED CRITERIA

(71) Applicant: FUJITSU LIMITED, Kawasaki-shi, Kanagawa (JP)

(72) Inventors: Tsunemichi Harada, Machida (JP); Masatoshi Nakamura, Machida (JP); Atsushi Igashira, Yokohama (JP); Hideo Takahashi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 36 days.

(21) Appl. No.: 14/961,390

(22) Filed: Dec. 7, 2015

(65) Prior Publication Data

US 2016/0239204 A1   Aug. 18, 2016

(30) Foreign Application Priority Data

Feb. 17, 2015   (JP) .................................. 2015-028397

(51) Int. Cl.
*G06F 3/06* (2006.01)
*G06F 12/00* (2006.01)
*G06F 12/08* (2016.01)

(52) U.S. Cl.
CPC .......... *G06F 3/061* (2013.01); *G06F 3/0607* (2013.01); *G06F 3/0619* (2013.01); *G06F 3/0665* (2013.01); *G06F 3/0689* (2013.01); *G06F 12/00* (2013.01); *G06F 12/08* (2013.01)

(58) Field of Classification Search
CPC ...... G06F 3/061; G06F 3/0607; G06F 3/0619; G06F 3/0665; G06F 3/0689
USPC .................................................. 711/155, 114
See application file for complete search history.

(56) References Cited

U.S. PATENT DOCUMENTS

| | | | |
|---|---|---|---|
| 5,740,465 A | 4/1998 | Matsunami et al. | |
| 5,787,473 A * | 7/1998 | Vishlitzky ........... | G06F 11/3419 711/134 |
| 2002/0108017 A1 * | 8/2002 | Kondhammana-Hoskote | G06F 12/0804 711/113 |
| 2012/0221809 A1 * | 8/2012 | Yoshikawa ........... | G06F 3/0613 711/155 |

FOREIGN PATENT DOCUMENTS

| | | |
|---|---|---|
| JP | 6-75709 | 3/1994 |
| JP | 2010-33396 | 2/2010 |

* cited by examiner

*Primary Examiner* — Than Nguyen
(74) *Attorney, Agent, or Firm* — Fujitsu Patent Center

(57) ABSTRACT

A receiver unit receives data write commands for a memory device. A control unit determines a use situation of an RMW cache used in a read-modify-write process by the memory device, on the basis of write sizes, a reception frequency, and the number of received commands. A control unit decides whether or not to execute a read-modify-write process by a storage control apparatus on the basis of the determination result.

11 Claims, 15 Drawing Sheets

EXAMPLES OF WRITES

RMW PERFORMANCE TABLE 141

| FREQUENCY | PERFORMANCE MEASUREMENT RESULT OF EACH WRITE SIZE ||||||| |
|---|---|---|---|---|---|---|---|
| | 8KB || 64KB || 128KB || ... |
| | COUNT | TIME | COUNT | TIME | COUNT | TIME | ... |
| 10 MULTIPLEX | c11 | t11 | c12 | t12 | c13 | t13 | ... |
| 1 COMMAND IN 100 ms | c21 | t21 | c22 | t22 | c23 | t23 | ... |
| 1 COMMAND IN 200 ms | c31 | t31 | c32 | t32 | c33 | t33 | ... |
| 1 COMMAND IN 500 ms | c41 | t41 | c42 | t42 | c43 | t43 | ... |
| 1 COMMAND IN 1000 ms | c51 | t51 | c52 | t52 | c53 | t53 | ... |
| 1 COMMAND IN 2000 ms | c61 | t61 | c62 | t62 | c63 | t63 | ... |
| ... | ... | ... | ... | ... | ... | ... | ... |

FIG. 10

| RMW MANAGEMENT TABLE ||||
|---|---|---|---|
| RAID ID | HDD ID | RMW EXECUTION FLAG | ACCESS TENDENCY |
| R1 | D1 | true | 1 COMMAND/100 ms, 8 KB |
| R1 | D2 | true | 1 COMMAND/100 ms, 8 KB |
| R1 | D3 | true | 1 COMMAND/100 ms, 8 KB |
| R2 | D4 | false | — |
| R2 | D5 | false | — |
| R2 | D6 | false | — |
| R3 | D7 | true | 1 COMMAND/500 ms, 64 KB |
| ... | ... | ... | ... |

FIG. 11

CACHE READ-MODIFY-WRITE PROCESS CONTROL BASED ON MONITORED CRITERIA

CROSS-REFERENCE TO RELATED APPLICATION

This application is based upon and claims the benefit of priority of the prior Japanese Patent Application No. 2015-028397, filed on Feb. 17, 2015, the entire contents of which are incorporated herein by reference.

FIELD

The embodiments discussed herein relate to a storage control apparatus and a control method.

BACKGROUND

Currently, storage apparatuses are utilized to store data. A storage apparatus includes a plurality of memory devices, such as hard disk drives (HDD) and solid state drives (SSD), to provide a large storage region. A storage apparatus is connected to a storage control apparatus that controls access to the memory devices for the purpose of data write and data read. A storage apparatus includes a storage control apparatus in some cases.

In the meantime, each memory device writes data into each unit (for example, physical sector unit) of a memory medium inside the memory device. When writing data that is smaller than a unit, each memory device executes what is called a read-modify-write process. Each memory device includes a cache for use in the read-modify-write process.

For example, the following procedure is performed to write data into a part of a physical sector. Each memory device reads all information of a target physical sector into a cache in the memory device (Read). The memory device modifies a modification target part of the information that is read into the cache (Modify). The memory device writes the modified information of the cache into the same physical sector (Write).

There is a proposal of an information processing apparatus that measures a read-modify-write processing speed of a host control unit and a read-modify-write processing speed of a media control unit and selects the unit having a higher processing speed to execute a read-modify-write process in the selected unit.

Also, there is a proposal in which a selection condition is detected from input/output (I/O) requests from a host computer, and an optimal processing method is selected and executed from among a plurality of read-modify-write processing methods on the basis of the selection condition.

See, for example, Japanese Laid-open Patent Publication Nos. 2010-33396 and 6-75709.

It is concerned that the time that it takes for a memory device to respond to a write process increases, when a free space of a cache becomes insufficient for read-modify-write processing by the memory device. Thus, a problem lies in how to change a read-modify-write executor from a memory device to a storage control apparatus, before the response performance of the memory device deteriorates.

For example, one can conceive of acquiring information of a used space of a cache in a memory device from the memory device in order to monitor the used space and detect a sign indicating deterioration of response performance due to insufficiency of a free space of the cache. However, the implementation method of a cache mechanism varies depending on vendors, and in addition its information is not disclosed in many cases, and thus it is difficult to monitor the used space of the cache directly from outside.

SUMMARY

According to one aspect, there is provided a storage control apparatus including: a receiver unit configured to receive commands of data write into a memory device; and a processor configured to determine a use situation of a cache used in a read-modify-write process by the memory device on the basis of write sizes, a reception frequency, and the number of received commands, and decide whether or not to execute a read-modify-write process by the storage control apparatus on the basis of a determination result.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 illustrates an example of an RMW performance table;

FIG. 11 illustrates an example of an RMW management table;

DESCRIPTION OF EMBODIMENTS

Figure 1:
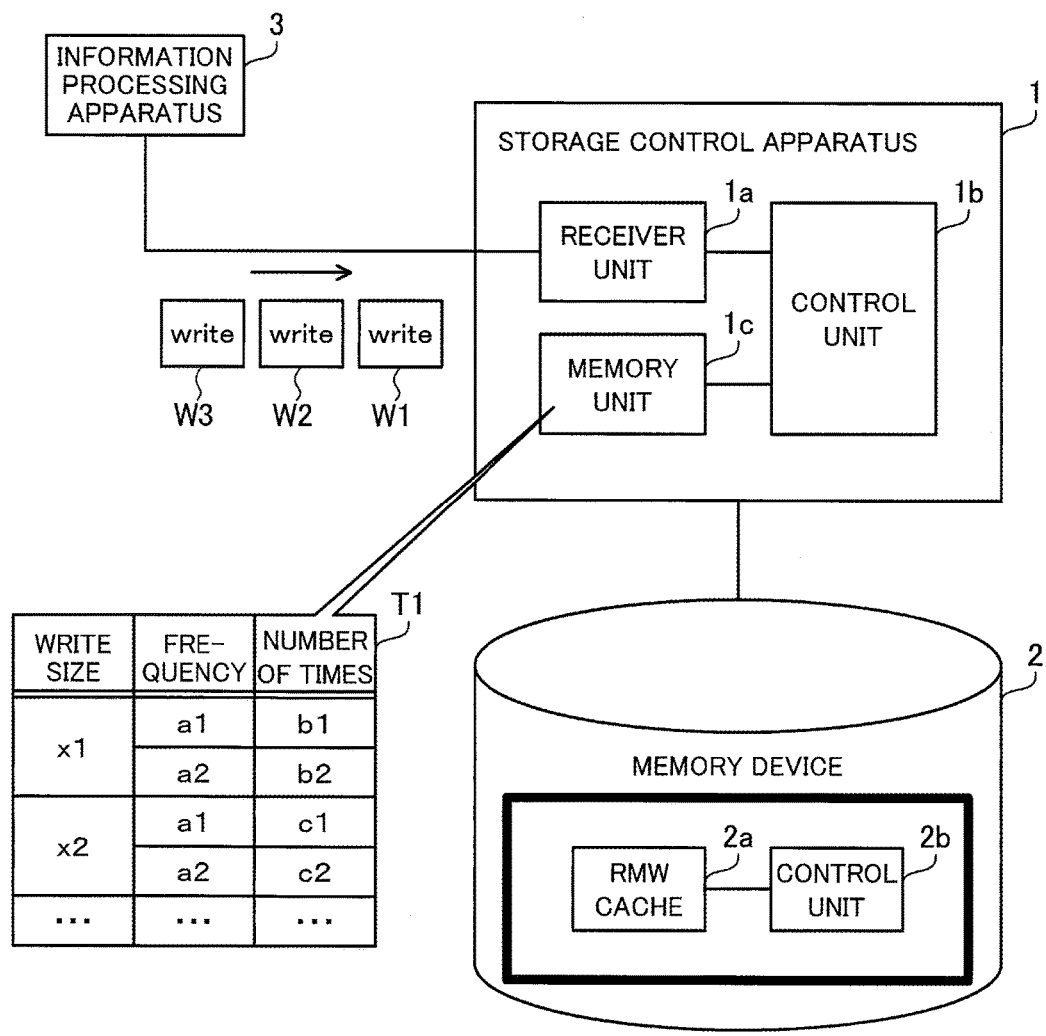
FIG. 1 illustrates a storage control apparatus of a first embodiment.

Several embodiments will be described below with reference to the accompanying drawings, wherein like reference numerals refer to like elements throughout.

First Embodiment

FIG. 1 illustrates a storage control apparatus of the first embodiment. The storage control apparatus 1 is connected to a memory device 2 and an information processing apparatus 3. The memory device 2 is an HDD, for example. The information processing apparatus 3 is a client computer or a server computer, for example. The storage control apparatus 1 and the information processing apparatus 3 may be connected to each other directly by a cable (for example, a fiber channel cable), or may be connected via a network, such as a storage area network (SAN) or a local area network (LAN).

The storage control apparatus 1 receives a data write command and a data read command to the memory device 2. The storage control apparatus 1 controls a data write and a data read for the memory device 2 in response to the received commands. The storage control apparatus 1 is sometimes referred to as a controller module or a controller.

The storage control apparatus 1 may be connected to a storage apparatus having a plurality of internal memory devices including the memory device 2. In that case as well, the storage control apparatus 1 controls a data write and a data read with respect to each memory device in the storage apparatus. The storage control apparatus 1 may be provided in the storage apparatus.

In some cases, the memory device 2 executes a read-modify-write process for writing data into a memory medium in the memory device 2 (for example, a magnetic disk of an HDD). In the following, "read-modify-write" is sometimes abbreviated to RMW. The memory device 2 includes an RMW cache 2a for use in an RMW process (for example, a partial region of a memory medium in the memory device 2) and a control unit 2b for executing an RMW process (for example, an application specific electronic circuit). Information of how the control unit 2b uses the RMW cache 2a is not disclosed, and thus information of the maximum capacity and a used space of the RMW cache 2a are unable to be retrieved directly from outside.

The storage control apparatus 1 includes a receiver unit 1a, a control unit 1b, and a memory unit 1c. The receiver unit 1a is a communication interface, for example. The control unit 1b may include a central processing unit (CPU), a digital signal processor (DSP), an application specific integrated circuit (ASIC), a field programmable gate array (FPGA), etc. The control unit 1b may be a processor for executing programs. "Processor" can include a group of processors (multiprocessor). The memory unit 1c may be a volatile memory device, such as a random access memory (RAM), or may be a non-volatile memory device, such as an HDD and a flash memory.

The receiver unit 1a receives data write commands and data read commands which are transmitted from the information processing apparatus 3 to the memory device 2. A write command includes information indicating data to be written and a write destination address. The size of data to be written is the write size of a write command. Write commands issued by the information processing apparatus 3 within a certain period tend to have a specific write size and a specific frequency (access tendency), in many cases. In order to write data, the information processing apparatus 3 issues write commands W1, W2, and W3 of a certain write size at a certain frequency, depending on a processing situation of software executed by the information processing apparatus 3, for example.

The control unit 1b determines how a cache (the RMW cache 2a) is used for an RMW process in the memory device 2 on the basis of the write sizes, the reception frequency, and the number of received write commands. The control unit 1b decides whether or not to execute an RMW process by itself (the storage control apparatus 1) on the basis of the determination result.

For example, the control unit 1b recognizes an access tendency which indicates that write commands of a certain write size are issued at a predetermined frequency, on the basis of a reception situation of the write commands W1, W2, and W3 received from the information processing apparatus 3. When receiving write commands a predetermined number of times in such an access tendency, the control unit 1b determines that data contained in the RMW cache 2a is increasing and that it is highly possible that the free space of the RMW cache 2a will become insufficient soon.

The control unit 1b may create in advance performance information of the memory device 2 corresponding to write access tendency (write size and write frequency) and store the created performance information in the memory unit 1c, for example. More specifically, the control unit 1b may create a table T1 beforehand when preparing for a start of operation and store the table T1 in the memory unit 1c. The table T1 is performance information indicating a correspondence relationship between write size, write frequency, and the number of commands that are issued until a response time deteriorates (for example, a response time increases above a predetermined threshold value). The number of commands issued until a response time deteriorates is acquired as performance of the memory device 2, because it is highly possible that free space insufficiency of the RMW cache 2a causes write response time deterioration.

Note that, with regard to the memory device 2, when there is a comparatively large amount of free space in the RMW cache 2a, the response time is approximately constant or increases comparatively slowly in response to the increase of the data write size and the data write frequency. When the free space of the RMW cache 2a becomes insufficient, a response time increases at a higher increase rate than when there is a comparatively large free space (i.e., an increase rate of response time according to the write size and the write frequency). Hence, the control unit 1b may detect response time deterioration on the basis of a change of the write response time increase rate of the memory device 2.

The table T1 includes entries of a write size x1, a frequency a1, and the number of times b1, for example. This means that, if write commands of the write size x1 are issued at the frequency a1, the response time of the memory device 2 deteriorates when the write commands are issued the number of times b1. In the table T1, there is another entry of the number of times (for example, b2) corresponding to a different frequency (for example, frequency a2) with respect to the same write size x1. In the table T1, there is a correspondence relationship between frequencies and the numbers of times with respect to other write sizes (for example, write size x2) as well.

In that case, the control unit 1b determines how the RMW cache 2a is used, on the basis of the write access tendency of the information processing apparatus 3 in operation (the access tendency in operation) and the number of received write commands, with reference to the table T1.

Specifically, the control unit 1b retrieves, from the table T1, the number of times according to the access tendency in operation (the number of commands issued until the response time deteriorates in the memory device 2). For example, when the access tendency in operation is the write size x1 and the frequency a1, the control unit 1b retrieves the number of times b1 from the table T1. Then, the control unit 1b calculates a value by multiplying the number of times b1 by a predetermined coefficient that is smaller than 1 (for example, 0.9), as a monitoring threshold value, for example. The number of times b1 is multiplied by the predetermined coefficient smaller than 1, in order to select a time point before a free space becomes insufficient. That is, the control unit 1b selects a time point before the number of times b1 is reached, because it is highly possible that the free space of the RMW cache 2a becomes insufficient if the number of times b1 is reached. The control unit 1b determines that it is highly possible that the free space of the RMW cache 2a will become insufficient soon (that is, it is highly possible that the response time of the memory device 2 will deteriorate), when the number of write commands received from the information processing apparatus 3 has reached the monitoring threshold value.

When determining that it is highly possible that the free space of the RMW cache 2a will become insufficient soon, the control unit 1b decides to execute an RMW process in the storage control apparatus 1. The storage control apparatus 1 starts executing an RMW process. The control unit 1b may execute an RMW process in the storage control apparatus 1. The control unit 1b may utilize the storage region of the memory unit 1c as an RMW cache. In the memory unit 1c, a storage region larger than the RMW cache 2a is allocated as an RMW cache. When the storage control apparatus 1 starts executing an RMW process, the memory device 2 is needless to execute an RMW process, and therefore the device that executes an RMW process is switched from the memory device 2 to the storage control apparatus 1.

In the meantime, at a normal time (when the free space of the RMW cache 2a does not become insufficient), a write response time is smaller when the memory device 2 executes an RMW process than when the storage control apparatus 1 executes an RMW process, in many cases. There is a following reason. When the storage control apparatus 1 executes an RMW process, the storage control apparatus 1 reads data from the memory device 2 and stores it in a cache in the storage control apparatus 1 (step 1), modifies the data in the same cache (step 2), and writes the data back into the memory device 2 from the same cache (step 3). Hence, data transmission between the storage control apparatus 1 and the memory device 2 generates a larger overhead than when only the memory device 2 executes an RMW process. Thus, at a normal time, it is efficient to execute an RMW process in the memory device 2.

In this case, one can conceive of comparing the RMW processing speed of the storage control apparatus 1 and the RMW processing speed of the memory device 2 in order to execute an RMW process in the device of higher processing speed, for example. However, when the RMW processing speed of the memory device 2 is lower than the RMW processing speed of the storage control apparatus 1, it is highly possible that the free space of the RMW cache 2a of the memory device 2 has already become insufficient. As described above, it is too late if an RMW execution device is decided in response to the comparison of RMW processing speeds, and it is impossible to switch the RMW execution device in response to the use situation of the RMW cache 2a. Deterioration of a response time of the memory device 2 results in processing delay of the information processing apparatus 3. For example, it is concerned that it badly affects user's task processing that involves accessing data in the memory device 2.

In contrast, the storage control apparatus 1 determines the use situation of the RMW cache 2a on the basis of the number of write commands received successively in a certain access tendency (a write size and a reception frequency), and decides whether or not to execute an RMW process instead of the memory device 2. Thereby, the storage control apparatus 1 executes an RMW process instead at an appropriate time before the free space of the RMW cache 2a becomes insufficient.

When the storage control apparatus 1 starts executing an RMW process, the memory device 2 stops executing an RMW process. Thereby, the free space of the RMW cache 2a of the memory device 2 is prevented from becoming insufficient. As a result, the response time of the memory device 2 is prevented from deteriorating. A bad influence on user's task processing is also prevented.

Note that, when the number of write accesses by the information processing apparatus 3 has decreased comparatively (for example, there is no write for a certain amount of time or more), the storage control apparatus 1 may stop executing an RMW process by itself and restart the execution of an RMW process by the memory device 2. When the write commands decrease to a certain extent, there is sufficient free space in the RMW cache 2a so as to reduce the possibility of free space insufficiency. Also, as described above, at a normal time, RMW processing efficiency is improved by causing the memory device 2 to execute an RMW process. This improves the performance of data write into the memory device 2.

Also, the storage control apparatus 1 may create the table T1 (performance information) in advance for each vendor and each model of the memory device 2 and compile them into a library. In that way, when performance information is once acquired, it can be diverted to a plurality of memory devices of the same vendor and the same model.

Further, as described above, the storage control apparatus 1 can be connected to a storage apparatus having a plurality of internal memory devices including the memory device 2. In that case, the storage control apparatus 1 may form a redundant array of independent disks (RAID) using the memory devices. When forming a RAID, the storage control apparatus 1 decides whether or not to execute an RMW process instead of each memory device, by the method of the first embodiment. Then, the storage control apparatus 1 executes an RMW process instead of each memory device.

Second Embodiment

Figure 2:
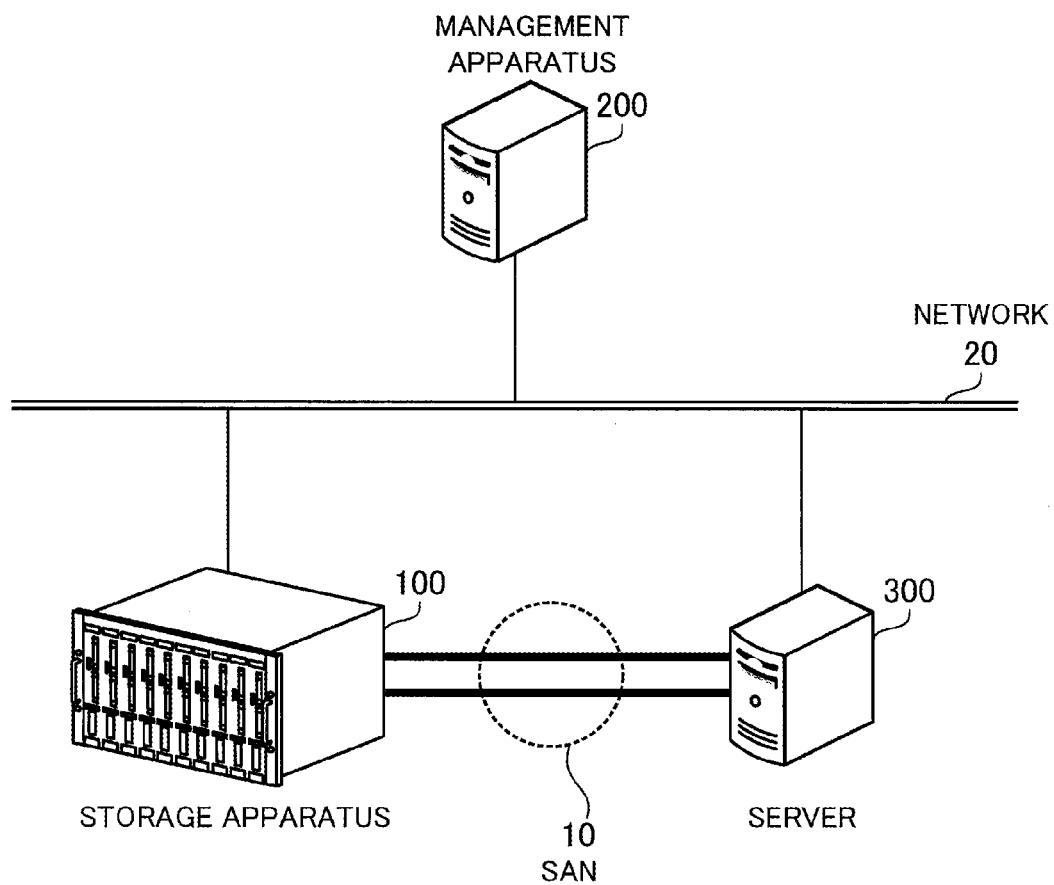
FIG. 2 illustrates an information processing system of a second embodiment.

FIG. 2 illustrates an information processing system of the second embodiment. The information processing system of the second embodiment includes a storage apparatus 100, a management apparatus 200, and a server 300. The storage apparatus 100 and the server 300 are connected to a SAN 10. The storage apparatus 100, the management apparatus 200, and the server 300 are connected to a network 20. The network 20 is a LAN, for example.

The storage apparatus 100 includes a plurality of internal HDDs and stores data for use in processing of the server 300. When receiving a data write command from the server 300, the storage apparatus 100 writes data into the internal HDDs. The storage apparatus 100 transmits a write result to the server 300. When receiving a data read command from the server 300, the storage apparatus 100 reads data from the internal HDDs and transmits the read data to the server 300. The storage apparatus 100 may include internal SSDs in addition to the HDDs.

The management apparatus 200 is a server computer that manages operation of the storage apparatus 100. The management apparatus 200 configures the setting for operation control of the storage apparatus 100 via the network 20, for example. The management apparatus 200 transmits a program that is to be executed by the storage apparatus 100 (for example, a firmware program) to the storage apparatus 100 via the network 20, in some cases.

The server 300 is a server computer that accesses data contained in the storage apparatus 100. The server 300 executes a business application program to provide a user with a task processing service.

Figure 3:
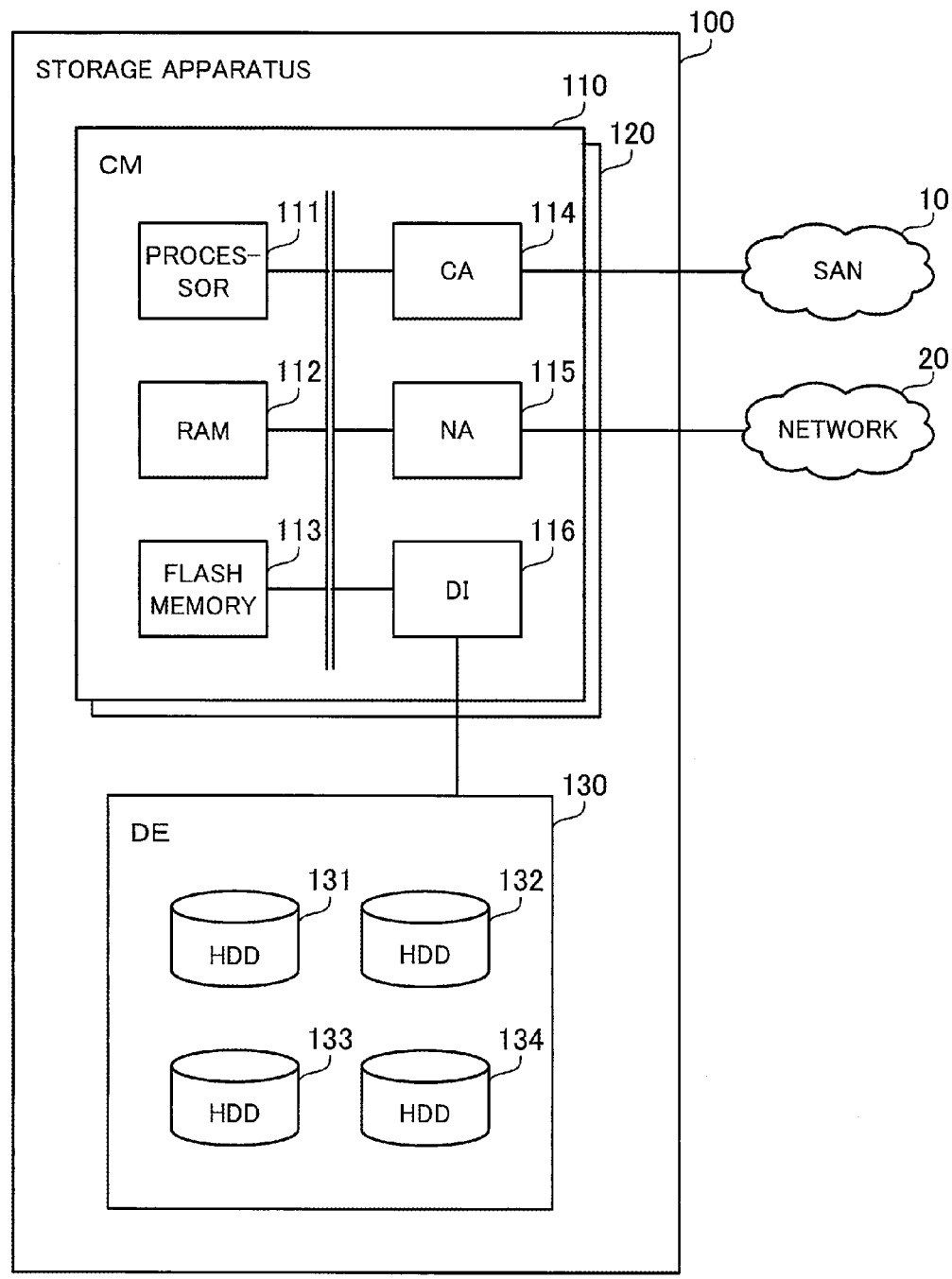
FIG. 3 illustrates exemplary hardware of a storage apparatus.

FIG. 3 illustrates exemplary hardware of the storage apparatus. The storage apparatus 100 includes controller modules (CM) 110 and 120, and a drive enclosure (DE) 130.

The CMs 110 and 120 manage the storage regions of HDDs in the DE 130 and control data accesses to the storage region. The CMs 110 and 120 are made redundant in the storage apparatus 100 in order to improve data access performance and fault tolerance. The CMs 110 and 120 are an example of the storage control apparatus 1 of the first embodiment.

The CM 110 includes a processor 111, a RAM 112, a flash memory 113, a channel adaptor (CA) 114, a network adaptor (NA) 115, and a drive interface (DI) 116. Each unit is connected to a bus of the CM 110. The CM 120 also includes the same units as the CM 110.

The processor 111 controls information processing of the CM 110. The processor 111 may be a multiprocessor. The processor 111 is a CPU, a DSP, an ASIC, or an FPGA, for example. The processor 111 may be a combination of two or more components of a CPU, a DSP, an ASIC, and an FPGA, for example.

The RAM 112 is a main memory device of the CM 110. The RAM 112 temporarily stores at least a part of a firmware program which is executed in the processor 111.

The flash memory 113 is an auxiliary memory device of the CM 110. The flash memory 113 is a non-volatile semiconductor memory. The flash memory 113 stores a firmware program, for example.

The CA 114 is a communication interface for communicating with the server 300 via the SAN 10. The type of the communication interface of the CA 114 is a fiber channel or a small computer system interface (SCSI), for example. The CM 110 may include a plurality of CAs to form a CA redundant configuration.

The NA 115 is a communication interface for communicating with other computers via the network 20. The type of the communication interface of the NA 115 is a network interface card (NIC) for connecting to a LAN, for example. The CM 110 may include a plurality of NAs to form an NA redundant configuration.

The DI 116 is a communication interface for communicating with the DE 130. The type of the communication interface of the DI 116 is a fiber channel or an SCSI, for example. The CM 110 may include a plurality of DIs to form a DI redundant configuration.

The DE 130 contains a plurality of HDDs including HDDs 131, 132, 133, and 134 (other HDDs are omitted). For example, the CMs 110 and 120 configure a logical storage region by a technology that is called RAID, using the HDDs 131, 132, 133, and 134, in order to improve data access performance and fault tolerance of each HDD.

Figure 4:
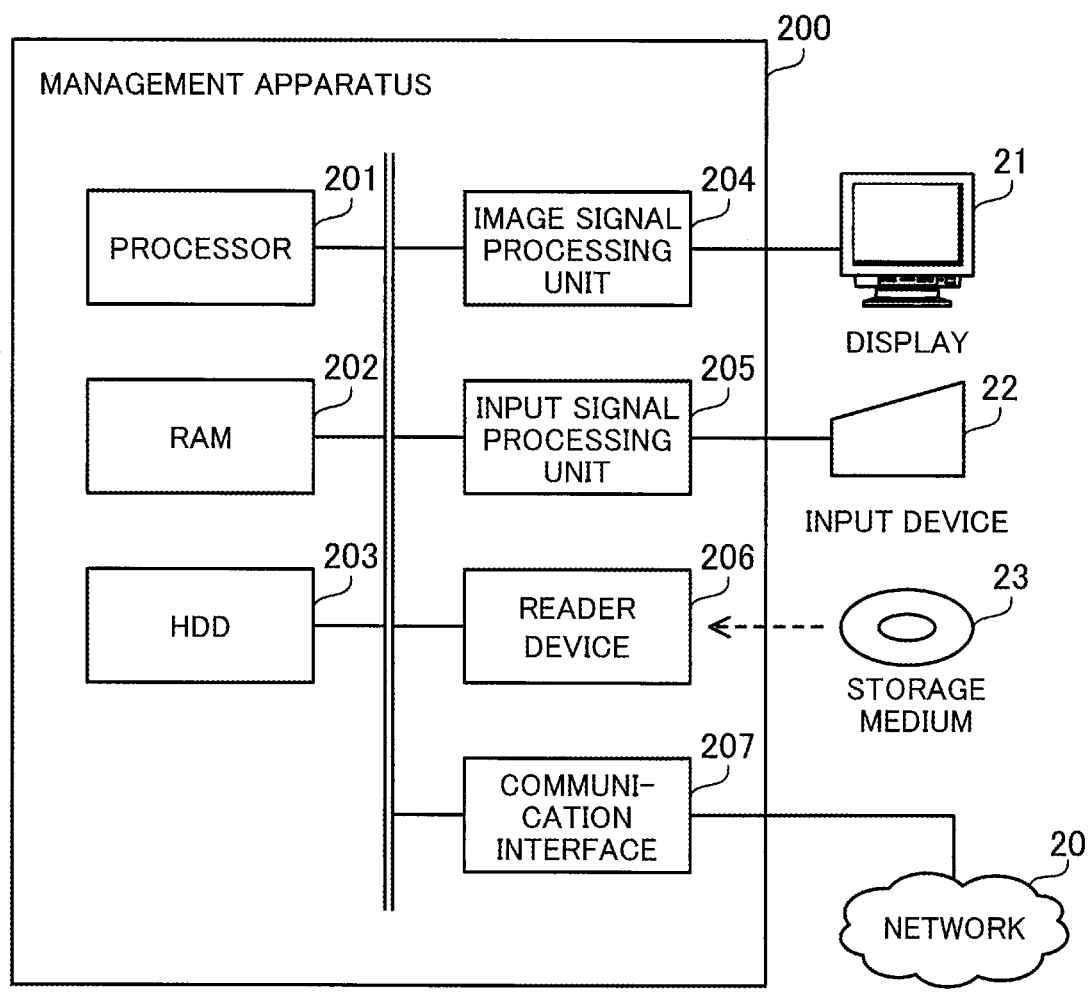
FIG. 4 illustrates exemplary hardware of a management apparatus.

FIG. 4 illustrates exemplary hardware of the management apparatus. The management apparatus 200 includes a processor 201, a RAM 202, an HDD 203, an image signal processing unit 204, an input signal processing unit 205, a reader device 206, and a communication interface 207. Each unit is connected to a bus of the management apparatus 200.

The processor 201 controls information processing of the management apparatus 200. The processor 201 may be a multiprocessor. The processor 201 is a CPU, a DSP, an ASIC, or an FPGA, for example. The processor 201 may be a combination of two or more components of a CPU, a DSP, an ASIC, and an FPGA, for example.

The RAM 202 is a main memory device of the management apparatus 200. The RAM 202 temporarily stores at least a part of an operating system (OS) program and application programs executed in the processor 201. Also, the RAM 202 stores various types of data used in processing by the processor 201.

The HDD 203 is an auxiliary memory device of the management apparatus 200. The HDD 203 magnetically writes data into and reads data from an internal magnetic disk. The HDD 203 stores an OS program, application programs, and various types of data. The management apparatus 200 may include an auxiliary memory device of another types, such as a flash memory or an SSD, and may include a plurality of auxiliary memory devices.

The image signal processing unit 204 outputs an image to a display 21 connected to the management apparatus 200 in accordance with a command from the processor 201. The display 21 is a cathode ray tube (CRT) display or a liquid crystal display, for example.

The input signal processing unit 205 receives an input signal from an input device 22 connected to the management apparatus 200, and outputs the received input signal to the processor 201. The input device 22 is a keyboard and a pointing device, such as a mouse or a touch panel, for example.

The reader device 206 reads programs and data from a storage medium 23. The storage medium 23 may be a magnetic disk such as a flexible disk (FD) and an HDD, an optical disc such as a compact disc (CD) and a digital versatile disc (DVD), or a magneto-optical disk (MO), for example. Also, the storage medium 23 is a non-volatile semiconductor memory, such as a flash memory card, for example. The reader device 206 reads programs and data from the storage medium 23 and stores them in the RAM 202 or the HDD 203 in accordance with a command from the processor 201, for example. The processor 201 can also transmit programs and data (for example, a firmware program and data for the storage apparatus 100) read from the storage medium 23, to the storage apparatus 100.

The communication interface 207 communicates with other devices via the network 20. The communication interface 207 may be a wired communication interface or a wireless communication interface.

Figure 5A:
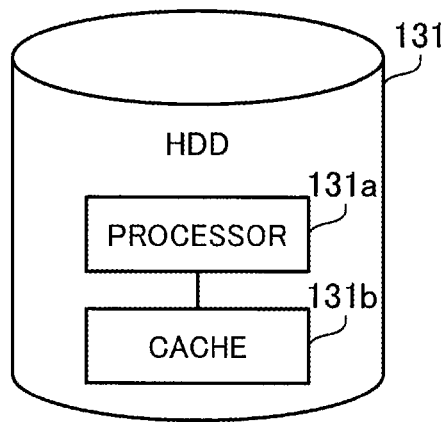
FIGS. 5A and 5B illustrate an example of an HDD.
Figure 5B:
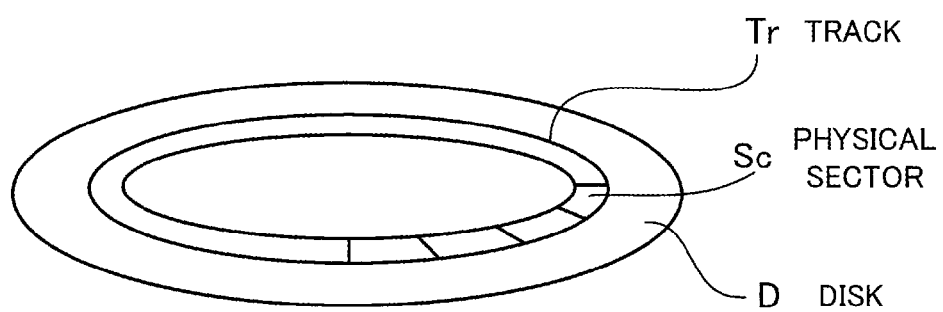

FIGS. 5A and 5B illustrate an example of an HDD. FIG. 5A illustrate hardware of the HDD 131 that executes a read-modify-write (RMW) process. The HDD 131 includes a processor 131a and a cache 131b. The processor 131a executes an RMW process in the HDD 131. The processor 131a may be an RMW dedicated ASIC or FPGA or may be a general-purpose processor for executing an RMW program.

The cache 131b is a storage region used in RMW processing by the processor 131a. The cache 131b may be a part of a storage region of a magnetic disk in the HDD 131 (sometimes referred to as a disk simply) or may be a semiconductor memory provided separately from the magnetic disk. The implementation method of the RMW dedicated processor 131a and cache 131b differs depending on vendors, and its information is not disclosed. Hence, information of the maximum capacity and a used space of the cache 131b are unable to be retrieved directly from the outside.

FIG. 5B illustrates a magnetic disk in the HDD 131. The HDD 131 includes a plurality of magnetic disks. The disk D is one of the magnetic disks. Regions extending along concentric circles on the disk D are each referred to as a track. A track Tr is one of a plurality of tracks on the disk D. Regions created by dividing the track Tr physically into predetermined-size units are each referred to as a physical sector. A physical sector Sc is one of the physical sectors on the track Tr.

In the following description, the size of one physical sector is set at 4096 bytes, which is equal to 4 kilo bytes (KB), for example. The structure including 4 KB physical sectors located on the disk D is sometimes referred to as 4 KB alignment. (Note that the size of one physical sector may be other sizes, such as 8 KB and 16 KB.) In this case, data is written into each 4 KB physical sector of the disk D of the HDD 131. That is, this physical sector is a data write unit in the HDD 131.

In recent years, as an HDD capacity and data amount processed at a time increase, the physical sector size of an HDD (for example, the HDD 131, 132, 133, and 134) has increased from previously utilized 512 bytes to 4 KB. On the other hand, some software, such as an OS that runs in the server 300, performs a data write, assuming that the sector size is 512 bytes (a smaller size than 4 KB). A write command from this software requests a write of 512 bytes multiplied by n (n is an integer equal to or greater than 1). Hence, the write does not conform to 4 KB alignment of physical sectors in the HDD 131.

Figure 6:
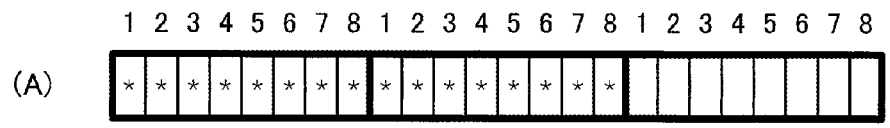
FIG. 6 illustrates examples of writes.
Figure 6:
Figure 6:
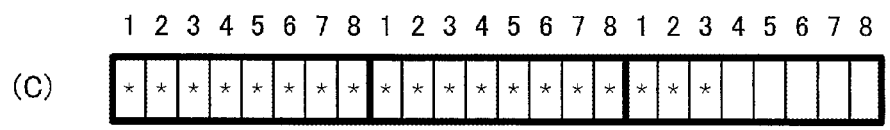
Figure 6:
Figure 6:
Figure 6:

FIG. 6 illustrates examples of writes. In FIG. 6, a part surrounded by a thick-black-edged rectangle represents a physical sector. A physical sector includes eight logical sectors (the number is calculated by dividing 4096 bytes by 512 bytes). In FIG. 6, a logical sector is represented by a rectangle which is created by dividing a physical sector into eight parts. A logical sector is identified by a number called a logical block address (LBA). A number on each logical sector indicates a relative address (offset) in relation to an LBA at the head of each physical sector. A relative address "1" is an LBA corresponding to the head of a physical sector. A relative address "8" is an LBA corresponding to the end of a physical sector. In FIG. 6, an area (a logical sector) that is to be written by a write command is indicated by an asterisk symbol "*" in a frame representing a logical sector.

When a write size is an integral multiple of 4 KB, and a head LBA of write destination (an LBA from which a write is started) corresponds to the head of a physical sector, the write conforms to the alignment of the physical sectors. On the other hand, when a write size is not an integral multiple of 4 KB, or when a head LBA of write destination does not correspond to the head of a physical sector, the write does not conform to the alignment of the physical sectors.

Here, in the following description, a write that does not conform to the alignment of a physical sector is sometimes referred to as "unaligned write". Also, a write command that requests an unaligned write is sometimes referred to as "unaligned write command".

For example, the write of FIG. 6(A) conforms to the alignment of a physical sector. This is because its write size is an integral multiple of 4 KB, and the head LBA of write destination corresponds to the head of the physical sector.

The write of FIG. 6(B) is an unaligned write. This is because its write size is not an integral multiple of 4 KB. Also, in the example of FIG. 6(B), the head LBA of write destination does not correspond to the head of a physical sector.

The write of FIG. 6(C) is an unaligned write. This is because, although its head LBA of write destination corresponds to the head of a physical sector, its write size is not an integral multiple of 4 KB.

The write of FIG. 6(D) is an unaligned write. This is because, although its write size is an integral multiple of 4 KB, its head LBA of write destination does not correspond to the head of a physical sector.

The HDD 131 executes an RMW process to emulate an unaligned write by a write operation of 4 KB alignment units.

Figure 7:
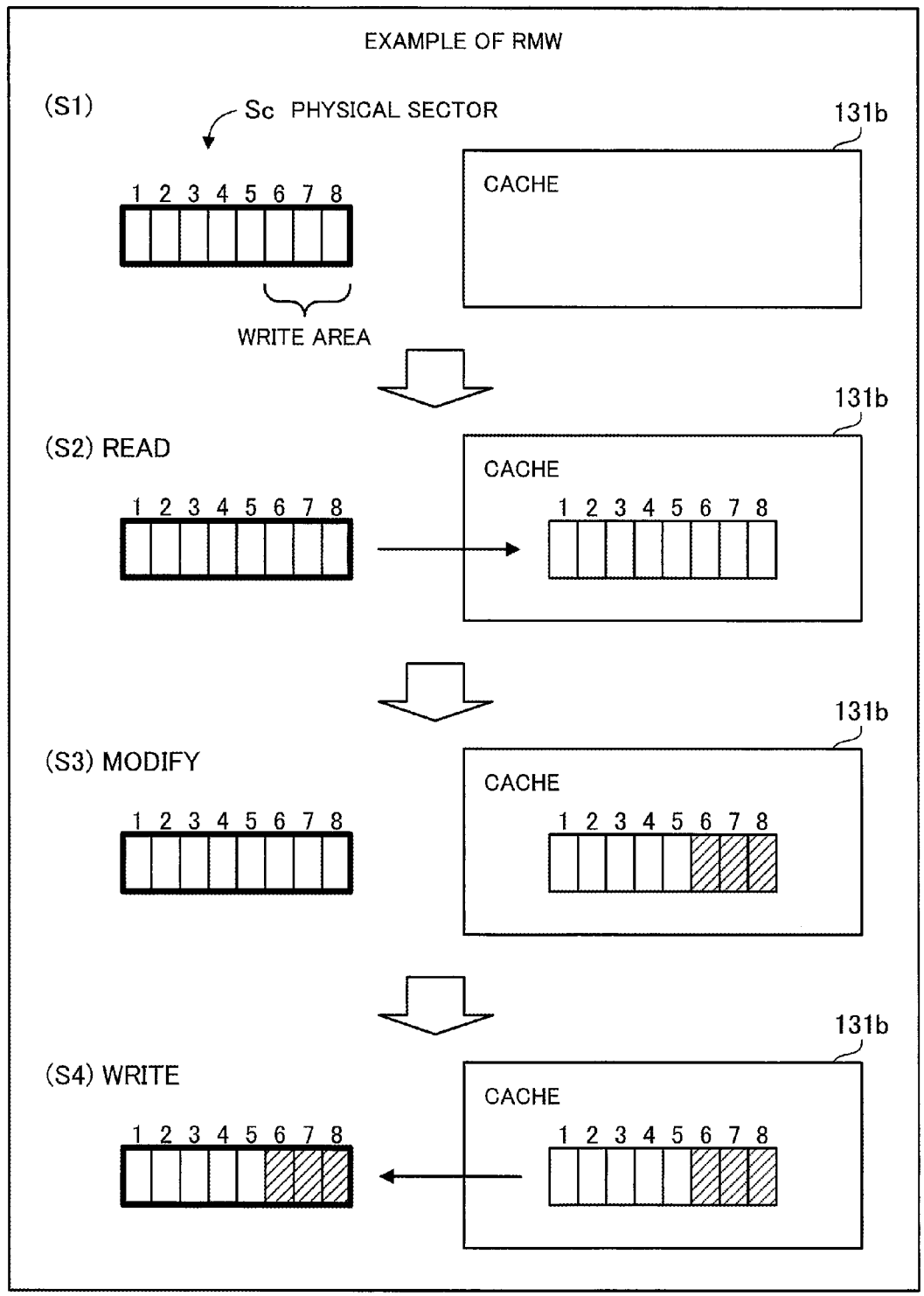
FIG. 7 illustrates an example of an RMW process.

FIG. 7 illustrates an example of an RMW process. FIG. 7 illustrates an example in which an RMW process is executed for an unaligned write at relative addresses 6, 7, and 8 in a physical sector Sc. The processor 131a accepts a request of an unaligned write into the logical sectors corresponding to the relative addresses 6, 7, and 8 in the physical sector Sc (step S1). The processor 131a reads data of all logical sectors in the physical sector Sc into the cache 131b (READ) (step S2).

The processor 131a modifies the parts corresponding to the relative addresses 6, 7, and 8 in the data read into the cache 131b (MODIFY) (step S3). The processor 131a writes data of all logical sectors of the cache 131b (data including the modified parts of the relative addresses 6, 7, and 8) into the physical sector Sc (WRITE) (step S4). As described above, the processor 131a executes a write operation of 4 KB alignment unit for the purpose of executing an unaligned write. An RMW process can increase the write overhead in the HDD 131.

Figure 8:
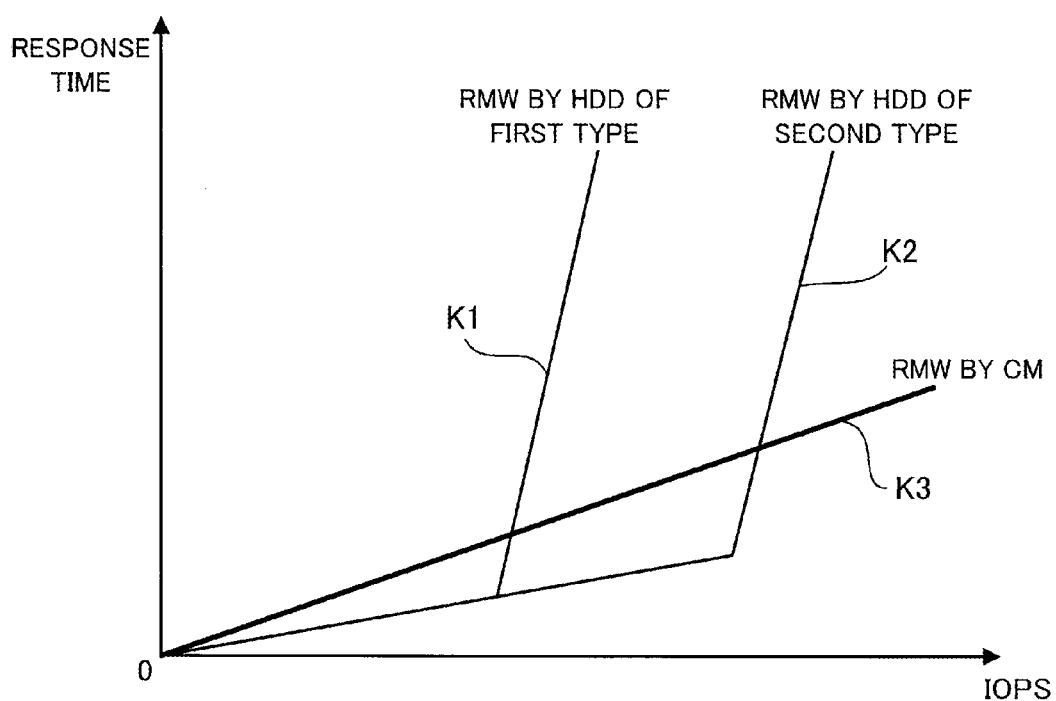
FIG. 8 illustrates an example of a relationship between a write response time and IOPS.

FIG. 8 illustrates an example of a relationship between write response time and IOPS. In FIG. 8, the horizontal axis represents input/output per second (IOPS) of write commands for the HDD, and the vertical axis represents a write response time of the HDD.

A line K1 indicates a relationship between IOPS and a response time when executing RMW processes by an HDD of the first type. The type of an HDD is identified by an HDD manufacturing vendor or an HDD model. A line K2 indicates a relationship between IOPS and a response time when executing RMW processes by an HDD of the second type. A line K3 indicates a relationship between IOPS and a response time when executing RMW processes by a CM (for example, the CMs 110 and 120) instead of an HDD. In each case of the lines K1, K2, and K3, write commands (unaligned writes) of a predetermined write size are issued a predetermined number of times.

According to the lines K1, K2, and K3, at a normal time (a period during which an RMW response time of an HDD is shorter than an RMW response time of a CM), executing RMW processes by an HDD is more efficient than executing RMW processes by a CM. This is because, when a CM executes RMW processes, the overhead increases due to data transmission between a CM and an HDD, as compared to when an HDD executes RMW processes. However, when a write processing load of an HDD increases to a certain extent, a write response time of the HDD deteriorates (the response time increases significantly). This is because the free space of an RMW cache becomes insufficient in the HDD. Hence, when the write processing load is large to a certain extent, executing RMW processes by an HDD is more efficient than executing RMW processes by a CM. This is because a CM can allocate a larger storage region for an RMW cache than an HDD.

Thus, the storage apparatus 100 provides a function to execute an RMW process instead by the CM 110 or 120, before the free spaces of the RMW caches of the HDDs 131, 132, 133, and 134 deplete.

Figure 9:
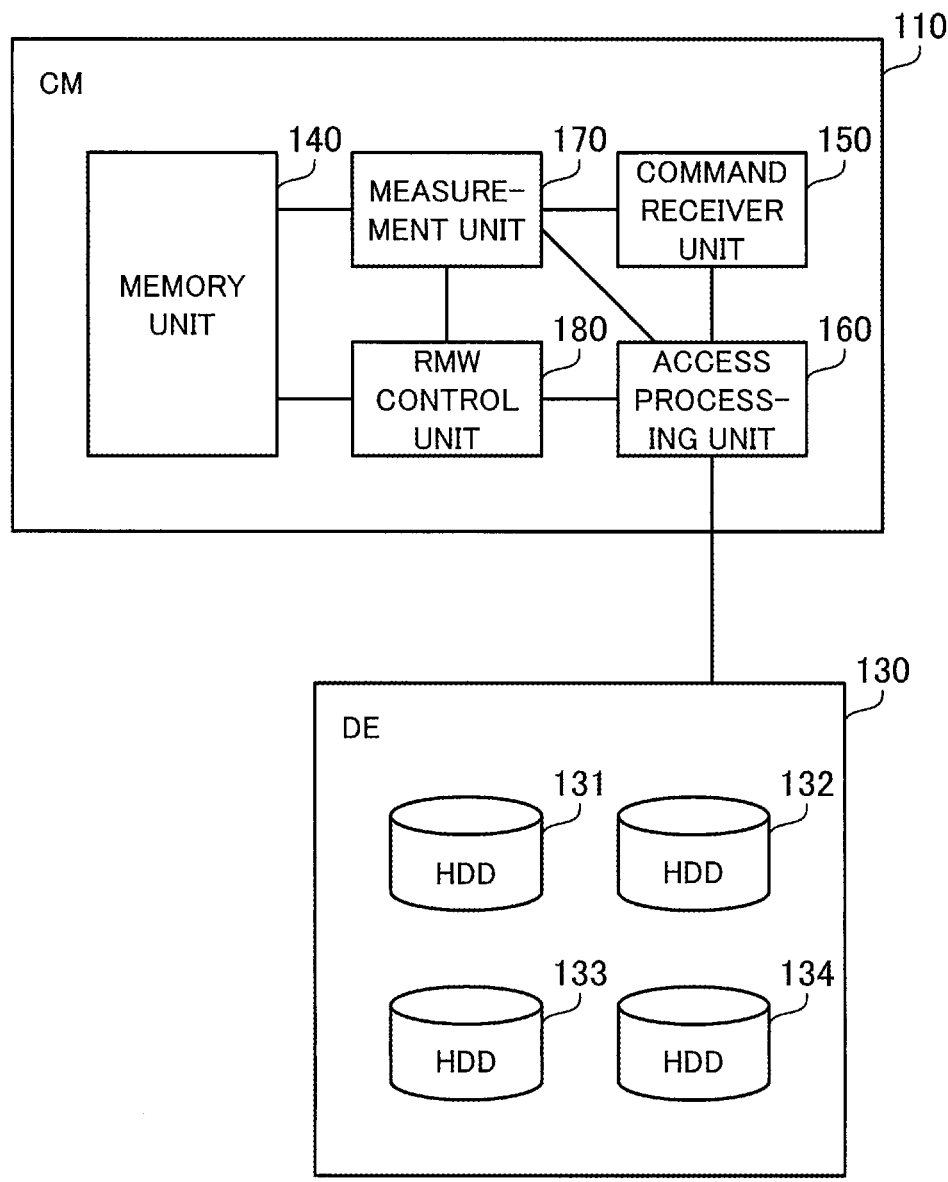
FIG. 9 illustrates an exemplary function of a controller module.

FIG. 9 illustrates an exemplary function of a CM. The CM 110 includes a memory unit 140, a command receiver unit 150, an access processing unit 160, a measurement unit 170, and an RMW control unit 180. The memory unit 140 is a storage region allocated in the RAM 112 or the flash memory 113. The processor 111 executes programs stored in the RAM 112 in order to configure the command receiver unit 150, the access processing unit 160, the measurement unit 170, and the RMW control unit 180.

The memory unit 140 stores performance information of HDDs measured by the measurement unit 170. The memory unit 140 stores management information for managing HDDs for which RMW processes are executed instead.

The command receiver unit 150 receives data write commands and data read commands issued by the server 300. Here, a data write command includes data to be written and information indicating a head LBA to start a write. The size of the data to be written is the write size of the write command.

The access processing unit 160 instructs a data write or a data read to the DE 130 in response to a command received by the command receiver unit 150. For example, the access processing unit 160 converts a logical address of write target or read target included in a command issued by the server 300, to a physical address. A physical address corresponds to HDDs, and the access processing unit 160 identifies which HDD is the target of the write/read request on the basis of this address. The access processing unit 160 instructs the DE 130 to write into the identified HDD or to read from the identified HDD. The access processing unit 160 receives a result of the write (write success, write failure, etc.) from the DE 130 and transmits the result to the server 300. The access processing unit 160 receives the read data from the DE 130 and transmits the read data to the server 300. Also, the access processing unit 160 instructs a data write to the DE 130 in response to a performance measuring write command generated by the measurement unit 170.

The measurement unit 170 acquires in advance performance information of the HDDs 131, 132, 133, and 134 in the DE 130 with respect to each vendor and each model. Specifically, during preparation of system operation, the measurement unit 170 issues a plurality of types of unaligned write commands to the HDD 131 in order to measure a response time of the HDD 131. The measurement unit 170 records the number of unaligned write commands that are issued until the response time of the HDD 131 deteriorates, as the performance information, in association with the write size and the issuance frequency. The measurement unit 170 stores the performance information in the memory unit 140.

Also, after starting system operation, the measurement unit 170 determines a write access tendency on the basis of a plurality of write commands received by the command receiver unit 150, and supplies the determined write access tendency to the RMW control unit 180. Further, the measurement unit 170 supplies the number of received write commands to the RMW control unit 180.

The RMW control unit 180 decides whether or not to execute an RMW process instead, on the basis of the measurement result of the write commands by the measurement unit 170 during the system operation and the performance information stored in the memory unit 140, with respect to each HDD. The RMW control unit 180 generates management information for managing HDDs for which RMW processes are executed instead, and stores the generated management information in the memory unit 140. The RMW control unit 180 executes an RMW process instead of each HDD on the basis of the management information.

Specifically, the RMW control unit 180 stores the physical sector information read from a target HDD by the access processing unit 160 in a cache allocated in the memory unit 140, and executes the same process as illustrated in FIG. 7.

That is, the read source of the physical sector information in FIG. 7 is not the cache 131*b* but the cache in the memory unit 140 (READ). The RMW control unit 180 modifies the information of the same cache (MODIFY), and thereafter writes the modified information of the same cache into the same physical sector via the access processing unit 160 (WRITE).

Here, the CM 120 also has the same function as the CM 110. For example, HDDs to be accessed from the CM 110 are different from HDDs to be accessed from the CM 120. The CMs 110 and 120 determine whether or not to execute an RMW process instead, with respect to the assigned HDDs.

FIG. 10 illustrates an example of an RMW performance table. The RMW performance table 141 is performance information of vendors and models of the HDDs 131, 132, 133, and 134. The RMW performance table 141 is contained in the memory unit 140. The RMW performance table 141 includes fields of frequency and performance measurement result of each write size.

The field of frequency includes entries of write command issuance frequencies. The field of performance measurement result of each write size includes entries of performance measurement results of each write size. Here, each of the fields of performance measurement result further includes a field of count and a field of time. The fields of count includes entries of the numbers of write commands that are issued until a response time deteriorates. It is assumed that, when deterioration of a response time is observed, the free space of an RMW cache of an HDD becomes insufficient (the free space depletes). The fields of time includes entries of times (referred to as data ejection time) that it takes to complete all RMW processes for the data in the cache after the free space of the cache depletes and a new write command stops coming. A data ejection time is information utilized to restart executing an RMW process by the HDD after stopping executing an RMW process by the CM 110 or 120.

For example, the RMW performance table 141 includes a set of entries including a frequency "10 multiplex", a count "c11" and a time "t11" for write size 8 KB, a count "c12" and a time "t12" for write size 64 KB, and a count "c13" and a time "t13" for write size 128 KB.

This information indicates the results of performance measurement of the HDD 131 under a condition that ten write commands are issued at predetermined time intervals (for example, 100 millisecond (ms)). Specifically, the above information indicates that, in the case of write size 8 KB, the free space of the cache 131*b* becomes insufficient and the response time deteriorates, when the number of issued commands reaches "c11". Also, the above information indicates that the subsequent data ejection time is "t11". The above information indicates that, in the case of write size 64 KB, the free space of the cache 131*b* becomes insufficient and the response time deteriorates, when the number of issued commands reaches "c12". Also, the above information indicates that the subsequent data ejection time is "t12". The information indicates that, in the case of the write size 128 KB, the free space of the cache 131*b* becomes insufficient and the response time deteriorates, when the number of issued commands reaches "C13". Also, the above information indicates that the subsequent data ejection time is "t13".

In the same way, the RMW performance table 141 includes a set of entries including a frequency "1 command in 100 ms", a count "c21" and a time "t21" for write size 8 KB, a count "c22" and a time "t22" for write size 64 KB, and a count "c23" and a time "t23" for write size 128 KB, for example. This information indicates the results of performance measurement of the HDD 131 under a condition that commands are issued at 100 ms intervals.

As described above, the RMW performance table 141 includes in advance the numbers of write commands issued until a cache depletes when the HDD 131 is subjected to a processing load under various conditions. The RMW performance table 141 is created in advance for each vendor and each model of HDDs by the CM 110 (or the CM 120), and is stored in the memory unit 140. For example, if the HDDs 131, 132, 133, and 134 are of the same model of the same vendor, the RMW performance table 141 created for the HDD 131 can be utilized for the HDDs 132 and 133, and 134 as well. The CM 120 also stores the same information as the RMW performance table 141.

FIG. 11 illustrates an example of an RMW management table. The RMW management table 142 is management information for managing HDDs for which the CM 110 executes an RMW process instead. The RMW management table 142 is stored in the memory unit 140. The RMW management table 142 includes fields of RAID identifier (ID), HDD ID, RMW execution flag, and access tendency.

The field of RAID ID includes entries of identifiers for identifying RAID groups (RAID ID). The field of HDD ID includes entries of identifiers for identifying HDDs (HDD ID). The field of RMW execution flag includes entries of flags indicating whether or not the CM 110 executes an RMW process for an HDD. When the CM 110 executes an RMW process, the entry of RMW execution flag is "true". When the CM 110 does not execute an RMW process, the entry of RMW execution flag is "false". The field of access tendency includes information of tendencies of write accesses to HDDs when the CM 110 executes an RMW process instead. In the field of access tendency, a detail of an access tendency is set when an RMW execution flag is "true". When an RMW execution flag is "false", an entry is not set (represented by a hyphen "-" in FIG. 11).

For example, the RMW management table 142 includes a set of entries including a RAID ID "R1", an HDD ID "D1", an RMW execution flag "true", and an access tendency "1 command/100 ms, 8 KB". This indicates that the CM 110 executes an RMW process for the HDD of HDD ID "D1" that belongs to the RAID group of RAID ID "R1", (that is, this HDD does not execute an RMW process). Also, this indicates that the tendency of write accesses to this HDD is a frequency of 1 command in 100 ms and a write size of 8 KB.

Also, for example, the RMW management table 142 includes a set of entries including a RAID ID "R2", an HDD ID "D4", an RMW execution flag "false", and an access tendency "-" (i.e., not set). This indicates that the CM 110 does not execute an RMW process for the HDD of HDD ID "D4" that belongs to the RAID group of RAID ID "R2", (that is, this HDD executes an RMW process).

In the above example, three HDDs identified by the HDD IDs "D1", "D2", and "D3" belong to the same RAID group. For example, the RAID level of this RAID group is RAID 5. In that case, when a data write is executed for this RAID group, the data write is executed for the three HDDs (the write size is calculated according to the degree of division of stored data. For example, when there are two stripe disks and one parity disk, a half size of written data is the write size of one HDD). When the vendors and the models of the three HDDs are same, the RMW cache capacity of each HDD becomes insufficient under the substantially same condition. Hence, the CM 110 starts executing RMW processes at the same time for the three HDDs that belong to the same RAID group.

Next, a processing procedure of the storage apparatus 100 will be described. First, a procedure of a measurement process for measuring performance of an HDD during preparation of system operation will be described. Thereafter, a procedure of an RMW switching process during system operation will be described.

Figure 12:
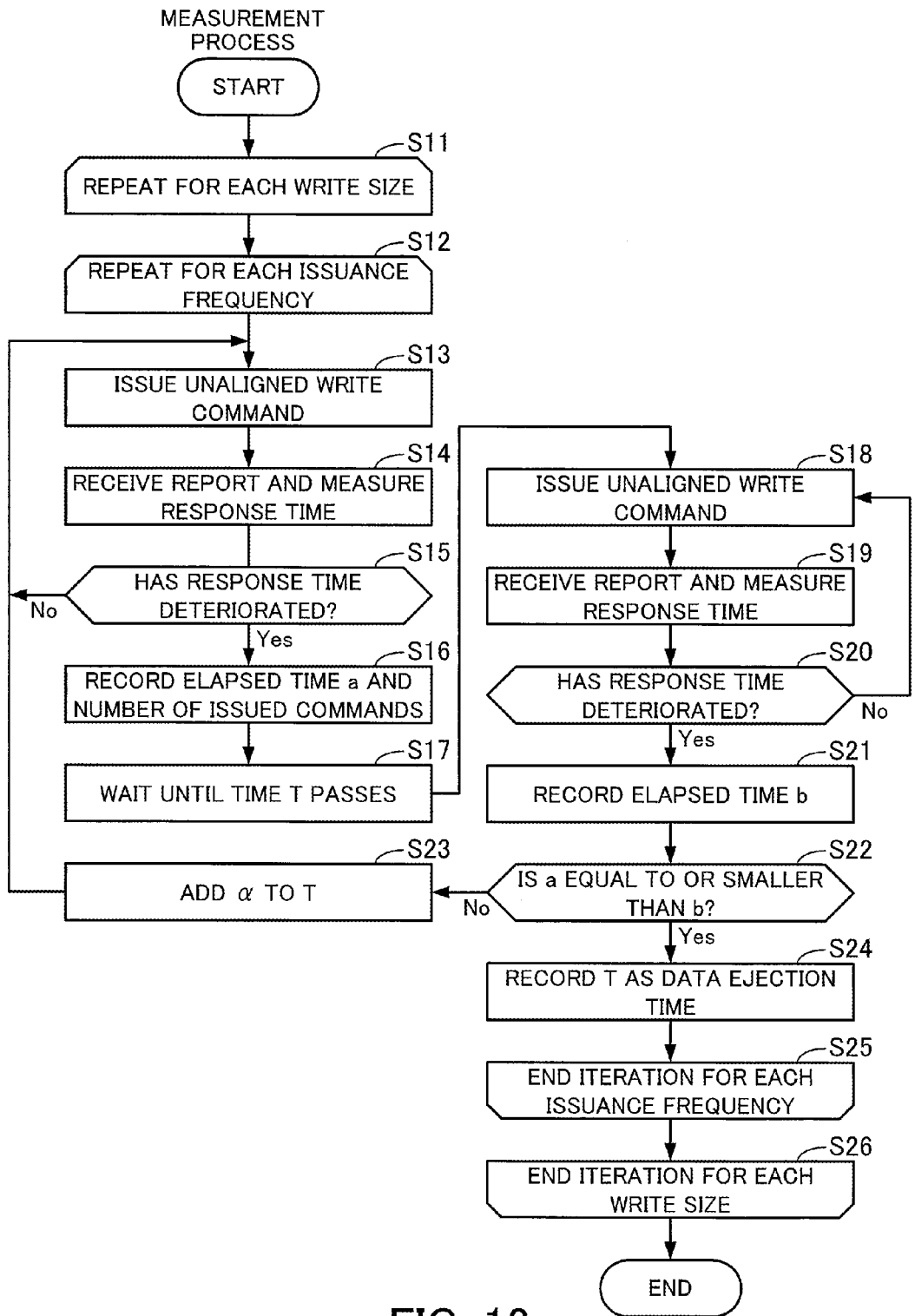
FIG. 12 is a flowchart illustrating an example of a measurement process.

FIG. 12 is a flowchart illustrating an example of the measurement process. In the following, the process illustrated in FIG. 12 will be described in the order of step numbers.

(S11) The measurement unit 170 repeatedly executes processes of steps S12 to S25 described below for each write size. Write sizes to be measured are set in advance in the memory unit 140. For example, a system developer or a system administrator creates a list of possible write sizes during operation, and sets the list in the memory unit 140 in advance. The measurement unit 170 selects a write size to be measured one by one in a sequential order from the list of write sizes, and executes the processes of steps S12 to S25 for each selected write size.

(S12) The measurement unit 170 repeatedly executes the processes of steps S13 to S24 described below for each write command issuance frequency. Frequencies to be measured are set in advance in the memory unit 140. For example, the system developer or a system administrator creates a list of possible write frequencies during operation, and sets the list in the memory unit 140 in advance. The measurement unit 170 selects an issuance frequency to be measured one by one in a sequential order from the list of the issuance frequencies, and executes the processes of steps S13 to S24 for each selected issuance frequency.

(S13) The measurement unit 170 issues unaligned write commands for the HDD 131. The write size is the size selected in step S11. The issuance frequency is the frequency selected in step S12. Test data is utilized as write data. The unaligned write commands are transmitted to the DE 130 via the access processing unit 160. The measurement unit 170 starts measuring a time with a timer from a time point at which the issuance of unaligned write commands is started in step S13 under the current condition (write size and issuance frequency). Also, the measurement unit 170 starts counting the number of issued unaligned write commands simultaneously with the start of the timer.

(S14) The measurement unit 170 receives a report (response) of write result at the HDD 131 for each unaligned write command. The measurement unit 170 measures a response time for each unaligned write command. The response time is a time from an issuance of an unaligned write command to a return of a report from the HDD 131 with respect to the unaligned write command, for example. The measurement unit 170 records response times time-sequentially in the memory unit 140.

(S15) The measurement unit 170 determines whether or not a response time has deteriorated. If the response time has deteriorated, the measurement unit 170 stops issuing an unaligned write command and proceeds to step S16. If the response time has not deteriorated, the measurement unit 170 proceeds to step S13 and continues issuing unaligned write commands. For example, the measurement unit 170 determines that the response time has deteriorated when the write response time of the HDD 131 is larger than a predetermined threshold value, and determines that the response time has not deteriorated when the response time is equal to or smaller than the predetermined threshold value. Alternatively, the measurement unit 170 may determine that the response time has deteriorated when a response time increase rate is larger than a predetermined rate (for example, 150% increase, 200% increase, etc.), and determine that the response time has not deteriorated when a response time increase rate is equal to or smaller than the predetermined rate. Information of a threshold value or an increase rate used in the determination is set in the memory unit 140 in advance.

(S16) The measurement unit 170 records time a (elapsed time a) that the timer has started measuring in step S13, in the memory unit 140. The measurement unit 170 records the number of unaligned write commands issued until the response time has deteriorated, in the field of count corresponding to the current frequency and the current write size in the RMW performance table 141. The measurement unit 170 resets the timer and the count value of the number of issued unaligned write commands.

(S17) The measurement unit 170 waits until a time T passes. An initial value of the time T is set in advance in the memory unit 140. The initial value of the time T is a relatively short time (for example, a shorter time than the time a). This enables enlarging the time T gradually to determine a data ejection time.

(S18) The measurement unit 170 issues unaligned write commands for the HDD 131. The write size and the issuance frequency are same as in step S13. The measurement unit 170 starts measuring a time with a timer from a time point at which the issuance of unaligned write commands is started in step S18 under the current condition (write size and issuance frequency).

(S19) The measurement unit 170 receives a report (response) of write result at the HDD 131 for each unaligned write command. The measurement unit 170 measures a response time for each unaligned write command. The measurement unit 170 records response times time-sequentially in the memory unit 140.

(S20) The measurement unit 170 determines whether or not the response time has deteriorated. The determination method is same as in step S15. If the response time has deteriorated, the measurement unit 170 stops issuing unaligned write commands and proceeds to step S21. If the response time has not deteriorated, the measurement unit 170 proceeds to step S18 and continues issuing unaligned write commands.

(S21) The measurement unit 170 records time b (an elapsed time b) that the timer has started measuring in step S18, in the memory unit 140. The measurement unit 170 resets the timer.

(S22) The measurement unit 170 determines whether or not a is equal to or smaller than b (a≤b) with respect to the recorded elapsed times a and b. If a is equal to or smaller than b, the process proceeds to step S24. If a is not equal to or smaller than b (that is, a is larger than b), the process proceeds to step S23.

(S23) The measurement unit 170 adds time α to the time T. The time α is added to increase the waiting time in step S17. The time α is set in advance in the memory unit 140. The time α may be approximately 5% or 10% of the initial value of the time T, for example. Then, the process proceeds to step S13. If the process proceeds to step S13, and the subsequent determination in step S15 is positive, the measurement unit 170 proceeds to step S16 again. In this case, the measurement unit 170 skips step S16 and executes step S17.

(S24) The measurement unit 170 records the time T as a data ejection time. Specifically, the measurement unit 170 records the time T in the field of time corresponding to the current frequency and the current write size (the access tendency when the elapsed time a is recorded) in the RMW performance table 141.

(S25) The measurement unit 170 ends the iteration, when finishing the measurement with respect to all issuance frequencies.

(S26) The measurement unit 170 ends the iteration, when finishing the measurement with respect to all write sizes.

In this way, the measurement unit 170 creates the RMW performance table 141. Note that, in step S13, the measurement unit 170 waits for a time that is considered to be sufficient to process all data in the cache 131b after the measurement under the condition of the last time, and thereafter starts the measurement under the condition of this time. This is to prevent the cache 131b from being affected by the unaligned write commands issued for the measurement under the condition of the last time. Note that, when starting the measurement under the condition of this time, the measurement unit 170 resets the time T to the initial value.

Figure 13:
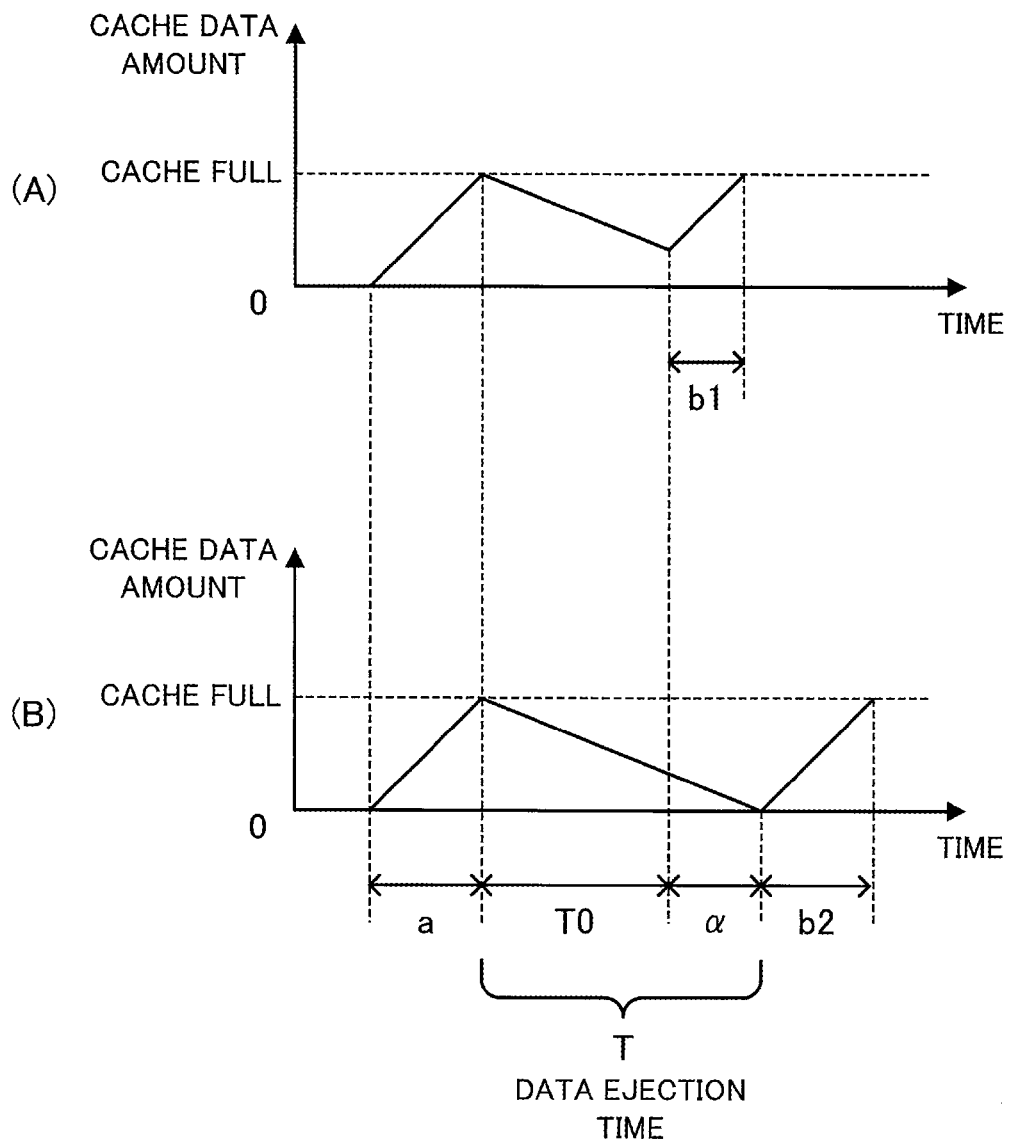
FIG. 13 illustrates an example of data ejection time.

FIG. 13 illustrates an example of a data ejection time. FIG. 13 illustrates a relationship between time and cache data amount (amount of data contained in the cache 131b). In each graph, the horizontal axis represents time, and the vertical axis represents cache data amount. FIG. 13(A) illustrates a case in which a data ejection time is unable to be decided. FIG. 13(B) illustrates a case in which a data ejection time is able to be decided. Here, T0 is the value of time T at a certain time point.

In FIG. 13(A), as unaligned write commands are issued, the cache 131b becomes full when the time a passes, and the free space becomes insufficient. Then, the measurement unit 170 detects that the response time of the HDD 131 has deteriorated, and acquires the elapsed time a (corresponding to step S16). Note that the measurement unit 170 is needless to acquire the elapsed time a again, when the measurement unit 170 has already acquired the elapsed time a under the current condition (access tendency) at this time point.

Thereafter, the measurement unit 170 stops issuing unaligned write commands and waits for time T0 (corresponding to step S17). While the measurement unit 170 is waiting, the data of the cache 131b is processed, and the cache data amount of the cache 131b decreases (the free space increases). The measurement unit 170 restarts issuing unaligned write commands (corresponding to step S18). When time b1 passes, the cache 131b becomes full, and the response time of the HDD 131 deteriorates, and therefore the measurement unit 170 acquires the elapsed time b1 (corresponding to step S21). In this case, a is larger than b1. Thus, the measurement unit 170 calculates T=T0+α.

In FIG. 13(B), as unaligned write commands are issued, the cache 131b becomes full when the time a passes, and the free space becomes insufficient. Thereafter, the measurement unit 170 stops issuing unaligned write commands and waits for time T0+α (corresponding to step S17). While the measurement unit 170 is waiting, the data of the cache 131b is processed, and the cache data amount of the cache 131b decreases (the free space increases). The measurement unit 170 restarts issuing unaligned write commands (corresponding to step S18). When time b2 passes, the cache 131b becomes full, and the response time of the HDD 131 deteriorates, and therefore the measurement unit 170 acquires the elapsed time b2 (corresponding to step S21). In this case, a is equal to or smaller than b2. Thereby, the measurement unit 170 decides time T=T0+α as a data ejection time.

Next, a procedure of an RMW switching process during system operation will be described. First, an example in which the device for executing an RMW process is switched from the HDD 131 to the CM 110 will be described. Thereafter, an example in which the device for executing an RMW process is switched from the CM 110 to the HDD 131 will be described. Although the procedure of the CM 110 is described mainly, the CM 120 also executes an RMW switching process for HDDs assigned to the CM 120 in accordance with the same procedure. Also, although the RMW switching process for the HDD 131 is described, the CM 110 performs RMW switching for other HDDs in the same way.

Figure 14:
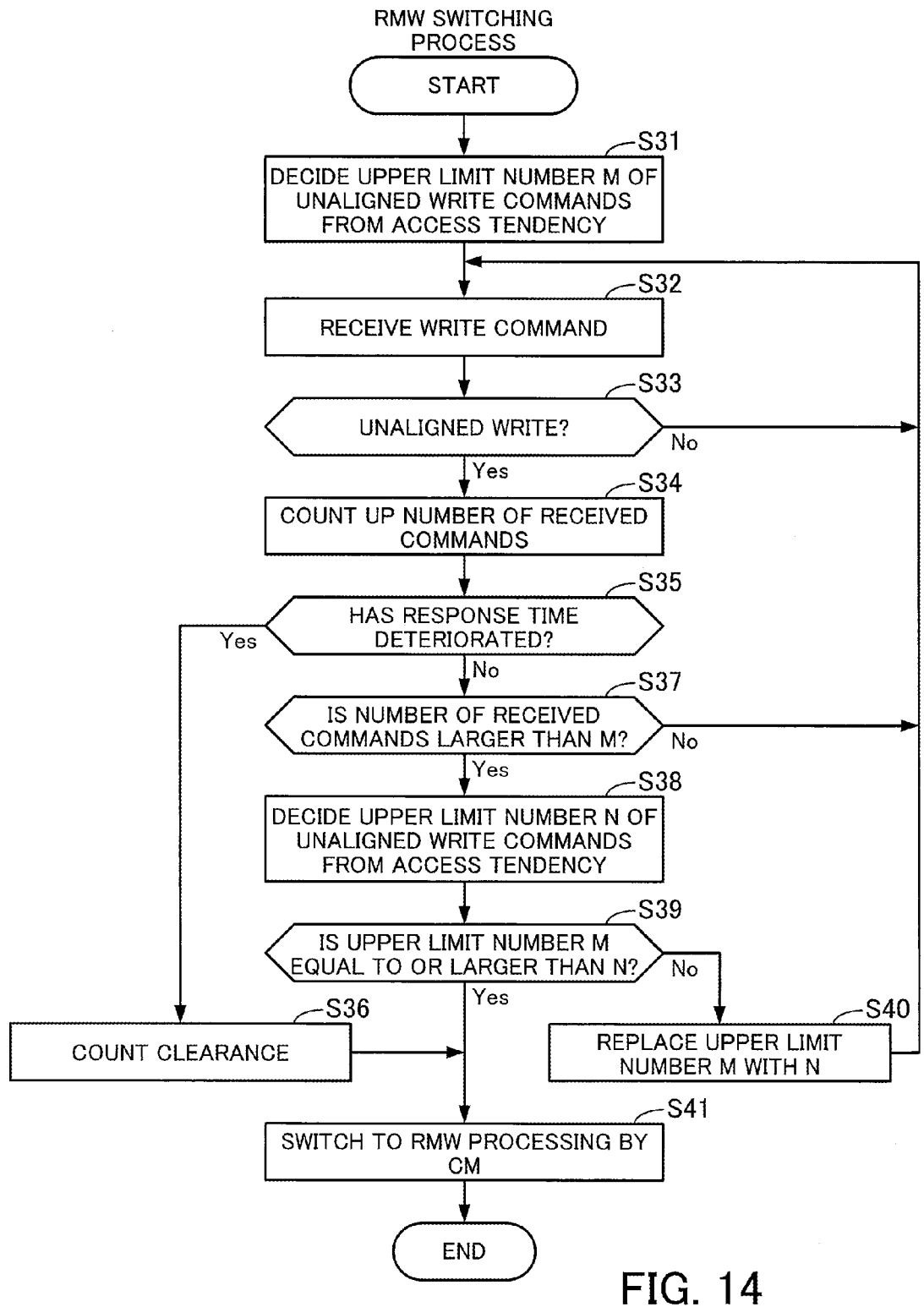
FIG. 14 is a flowchart illustrating an example of an RMW switching process (first)

FIG. 14 is a flowchart illustrating an example of the RMW switching process (first). In the following, the processes illustrated in FIG. 14 will be described in the order of step numbers. Before step S31, the CM 110 does not execute an RMW process instead of the HDD 131.

(S31) The command receiver unit 150 receives write commands from the server 300. The write commands instruct writes into the HDD 131 (or the RAID group that the HDD 131 belongs to). The measurement unit 170 decides the upper limit number M of unaligned write commands from the current access tendency (write size and reception frequency) of the received write commands. For example, the measurement unit 170 acquires a reception frequency of the commands (that is, a write command issuance frequency by the server 300) on the basis of the number of write commands received from the server 300 within a predetermined period. Also, the measurement unit 170 acquires a write size for the HDD 131 on the basis of an analysis result of write commands by a disk driver. The measurement unit 170 retrieves the count value C corresponding to the acquired reception frequency and write size from the RMW performance table 141. For example, the measurement unit 170 calculates M=β×C (0<β<1). For example, β is equal to 0.9.

(S32) The command receiver unit 150 receives a write command for the HDD 131 (or the RAID group that the HDD 131 belongs to) from the server 300. Note that, a write command is sent to the DE 130 via the access processing unit 160, and the DE 130 executes a write into each HDD in response to the write command. Note that the measurement unit 170 records write response times time-sequentially for each HDD (for the purpose of determination in below step S35).

(S33) The measurement unit 170 determines whether or not the received write command is an unaligned write. If the received write command is an unaligned write, the process proceeds to step S34. If the received write command is not an unaligned write, the process proceeds to step S32. The method for determining whether or not the received write command is an unaligned write is as illustrated in FIG. 6. Specifically, when the write size is an integral multiple of 4 KB, and the head LBA of write destination (the LBA from which a write is started) corresponds to the head of a physical sector, the write is not an unaligned write. On the other hand, when the write size is not an integral multiple of 4 KB, or when the head LBA of write destination does not correspond to the head of a physical sector, the write is an unaligned write.

(S34) The measurement unit 170 counts up (increments) the number of received unaligned write commands (adds 1 to the number of received commands).

(S35) The measurement unit 170 determines whether or not the response time of the HDD 131 has deteriorated. The determination method is same as step S15. If the response time of the HDD 131 has deteriorated, the process proceeds to step S36. If the response time of the HDD 131 has not deteriorated, the process proceeds to step S37.

(S36) The measurement unit 170 clears the count of the number of received commands (count clearance). Then, the process proceeds to step S41.

(S37) The measurement unit 170 determines whether or not the number of received commands is larger than the upper limit number M. If the number of received commands is larger than the upper limit number M, the process proceeds to step S38. If the number of received commands is equal to or smaller than the upper limit number M, the process proceeds to step S32.

(S38) The measurement unit 170 decides the upper limit number N of unaligned write commands on the basis of the current access tendency (write size and reception frequency) of write commands for the HDD 131 (or the RAID group that the HDD 131 belongs to) from the server 300. The method for deciding N is same as the method for deciding M in step S31 (using the same value as β).

(S39) The measurement unit 170 determines whether or not the upper limit number M is equal to or larger than N (M≥N). If M is equal to or larger than N, the process proceeds to step S41. If M is not equal to or larger than N (that is, M is smaller than N), the process proceeds to step S40.

(S40) The measurement unit 170 replaces the upper limit number M with N. Then, the process proceeds to step S32.

(S41) The RMW control unit 180 decides to switch from RMW processing by the HDD 131 to RMW processing by the CM 110. The RMW control unit 180 changes the setting of the RMW execution flag corresponding to the HDD 131 from "false" to "true" in the RMW management table 142. The RMW control unit 180 records the information of the current access tendency that is determined in step S38 with respect to the HDD 131, in the RMW management table 142. The RMW control unit 180 starts executing RMW processes for unaligned writes of the HDD 131.

In this way, the CM 110 switches from RMW processing by the HDD 131 to RMW processing by the CM 110. The upper limit number M is a value obtained by multiplying the count value recorded in the RMW performance table 141 by a coefficient smaller than 1, as described above. Hence, by the determination of step S37, RMW processing by the HDD 131 is switched to RMW processing by the CM 110, before the free space of the cache 131b in the HDD 131 becomes insufficient. In this case, when a plurality of HDDs of the same model of the same vendor form a RAID, other HDDs that belong to the same RAID group as the HDD 131 are also switched to RMW processing by the CM 110 at the same time as the HDD 131.

Note that the measurement unit 170 determines whether or not a received write command is an unaligned write in step S33, because the use situation of the cache 131b is not determined appropriately if the number of received commands is counted including write commands other than unaligned writes. In step S33, the use situation of the cache 131b is determined appropriately by counting only unaligned write commands.

Also, RMW processing by an HDD is switched to RMW processing by a CM immediately after deterioration of the response time is determined in step S35, in order to deal with the deteriorated response time promptly to improve the response time.

Further, the upper limit number N is acquired again on the basis of the access tendency at the time of step S39, because it is possible that there is a difference between the access tendency at the time of step S31 and the access tendency at the time of step S39. When the upper limit number M is smaller than N, the upper limit number M is replaced by N and the measurement is continued, assuming that the processing load of HDD 131 is lower at the time of step S39 than at the time of step S31. On the other hand, when the upper limit number M is equal to or larger than N, RMW processing by the HDD 131 is switched to RMW processing by the CM 110, assuming that the processing loads of writes into the HDD 131 is same at both times of steps S31 and S39 or is higher at the time of step S39. In this way, it is decided whether or not to execute an RMW process instead by the CM 110, while causing the HDD 131 to execute an RMW process as long as possible.

Figure 15:
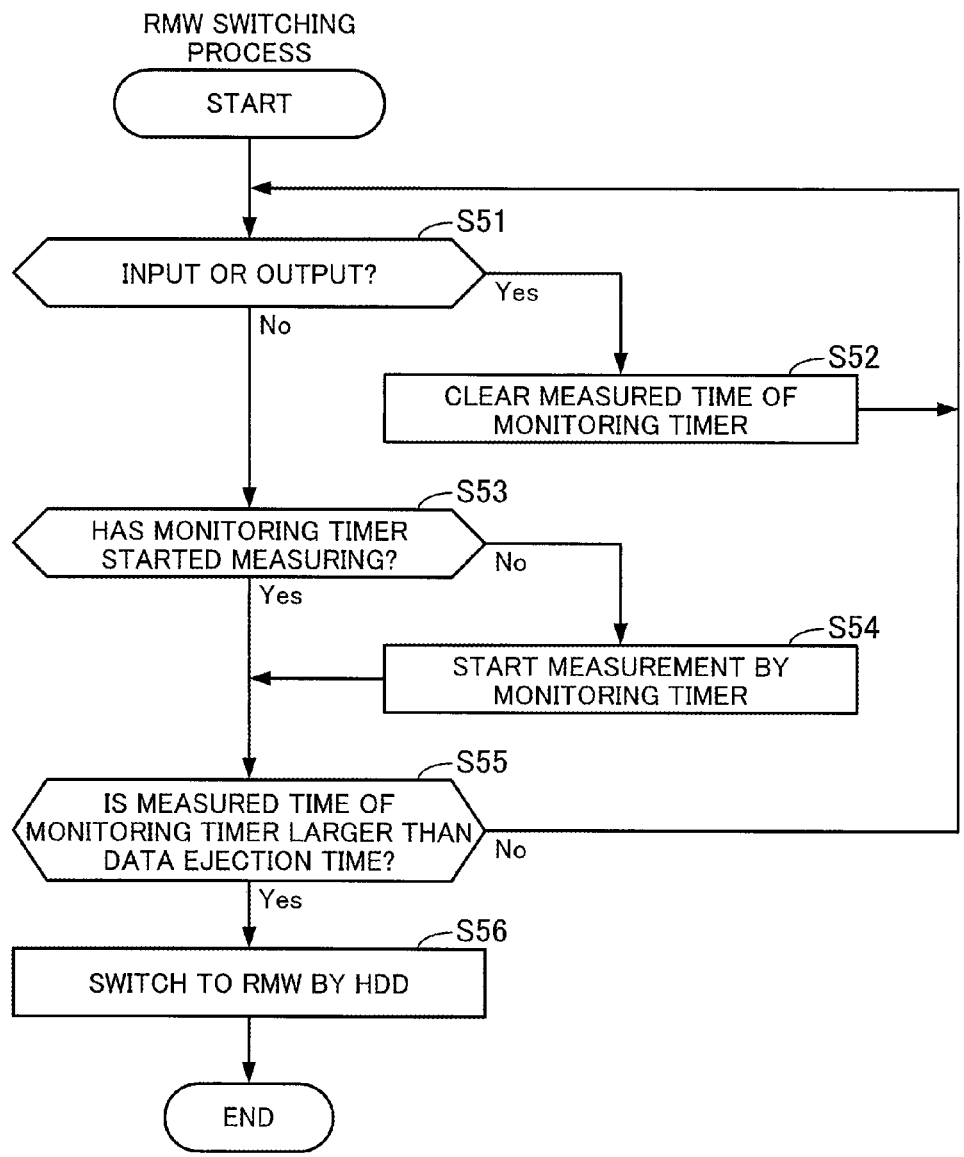
FIG. 15 is a flowchart illustrating an example of an RMW switching process (second).

FIG. 15 is a flowchart illustrating an example of the RMW switching process (second). In the following, the process illustrated in FIG. 15 will be described in the order of step numbers. Before step S51, the CM 110 executes an RMW process instead of the HDD 131.

(S51) The measurement unit 170 determines whether or not there is an input or an output with respect to the HDD 131 (or the RAID group that the HDD 131 belongs to). If there is an input or an output, the process proceeds to step S52. If there is no input or output, the process proceeds to step S53.

(S52) The measurement unit 170 clears (sets at 0) the measured time of a monitoring timer. Then, the process proceeds to step S51. If the monitoring timer has not started measuring a time, the process skips step S52 and proceeds to step S51.

(S53) The measurement unit 170 determines whether or not the monitoring timer has started measuring a time with respect to the HDD 131. If the monitoring timer has started, the process proceeds to step S55. If the monitoring timer has not started, the process proceeds to step S54.

(S54) The measurement unit 170 starts measuring a time with a monitoring timer. The measurement unit 170 provides a monitoring timer for each HDD. Then, the process proceeds to step S55.

(S55) With reference to the RMW management table 142, the measurement unit 170 retrieves information of access tendency corresponding to the HDD 131 in order to switch RMW processing. The measurement unit 170 retrieves the data ejection time corresponding to the retrieved access tendency from the RMW performance table 141. For example, when information of access tendency "1 command/100 ms, 8 KB" is recorded in the RMW management table 142 with respect to the HDD 131, the data ejection time is "t21" according to the RMW performance table 141. The measurement unit 170 determines whether or not the time measured by the monitoring timer is larger than the data ejection time. If the time is larger, the process proceeds to step S56. If the time is smaller, the process proceeds to step S51.

(S56) The RMW control unit 180 decides to switch from RMW processing by the CM 110 to RMW processing by the HDD 131. The RMW control unit 180 changes the setting of the RMW execution flag corresponding to the HDD 131 from "true" to "false" in the RMW management table 142, and deletes the information of the access tendency. Then, the RMW control unit 180 stops executing an RMW process for the HDD 131.

In this way, the CM 110 stops executing an RMW process instead at a time point when the data ejection time has passed without an input or output with respect to the HDD 131. This is because, when the data ejection time has passed without an input or output with respect to the HDD 131, it is assumed that all RMW data in the cache 131b has been processed, and the free space of the cache 131b has become sufficient.

Note that, for example, when a plurality of HDDs of the same model of the same vendor form a RAID, RMW processing by a CM is switched to RMW processing by the HDD 131 as well as other HDDs that belong to the same RAID group as the HDD 131 at the same time as the HDD 131. This is because, if there is no input and output with respect to the HDD 131, there is no input and output with respect to other HDDs that belong to the same RAID group.

Also, if there is a change in the information of access tendency recorded in the RMW management table 142 when the HDD 131 receives an input or output in the process of FIG. 15, the measurement unit 170 may update the information to the latest state. Then, in step S55, the measurement unit 170 may retrieve the data ejection time corresponding to the latest access tendency from the RMW performance table 141 and compare the retrieved data ejection time with the measured time.

As described above, the CM 110 determines a use situation of the cache 131b on the basis of the number of write commands that are received successively in a certain access tendency (write size and reception frequency), and decides whether or not to execute an RMW process instead of the HDD 131. Thereby, the CM 110 executes an RMW process instead at an appropriate time before the free space of the cache 131b becomes insufficient. In other words, the CM 110 determines the use situation of the cache 131b on the basis of a period during which a certain access tendency continues (frequency×period=reception number). Also, when the cache 131b has a sufficient free space, RMW processing by the HDD 131 is restarted. Thereby, write performance is improved in the storage apparatus 100. Also, data access performance is improved in the storage apparatus 100.

In the meantime, the information processing of the first embodiment is achieved by causing the control unit 1b to execute a program. Also, the information processing of the second embodiment is achieved by causing the processor 111 to execute a program. Such programs can be stored in the computer-readable storage medium 23.

For example, the storage medium 23 storing the program is distributed to put the program in the market. Also, the program may be stored in another computer to be distributed via a network. Each of the storage apparatus 100 and the CM 110 may be a computer having the processor 111 and the RAM 112. For example, the computer may contain (install) a program stored in the storage medium 23 or a program received from another computer (for example, the management apparatus 200) in a memory device such as the RAM 112 and the flash memory 113. The computer may read and execute the program from the memory device.

In one aspect, a read-modify-write process can be executed instead at an appropriate time.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage control apparatus comprising:
a receiver unit configured to receive commands of data write into a memory device; and
a processor configured to determine a use situation of a cache for a first read-modify-write process by the memory device on the basis of write sizes, a reception frequency, and the number of received commands, and decide whether or not to execute a second read-modify-write process by the storage control apparatus on the basis of the determined use situation,
wherein the processor determines the use situation of the cache on the basis of write sizes, a reception frequency, and the number of currently received commands, and information indicating the numbers of commands that increase a response time of the memory device above a threshold value, the numbers of commands each corresponding to a combination of a write size and a reception frequency of commands.

2. The storage control apparatus according to claim 1, wherein
the processor generates the information by issuing a plurality of commands, transmitting the commands to the memory device, and measuring response times of the memory device, with respect to a combination of a write size, a write frequency, and the number of issued commands.

3. The storage control apparatus according to claim 2, wherein
the processor generates the information for each vendor and for each model of the memory device.

4. The storage control apparatus according to claim 1, wherein
the processor determines that a free space of the cache will become insufficient when the number of received commands reaches a predetermined number that is smaller than the number of commands included in the information, and decides to execute the second read-modify-write process.

5. The storage control apparatus according to claim 1, wherein
the processor starts to execute the second read-modify-write process when the processor decides to execute the second read-modify-write process, and stops executing the second read-modify-write process, when the receiver unit does not receive a write command to the memory device for a predetermined time or more after the processor starts to execute the second read-modify-write process.

6. The storage control apparatus according to claim 5, wherein
the processor issues a plurality of write commands, and transmits the write commands to the memory device, and measures response times of the memory device to the write commands, and decides the predetermined time on the basis of a time elapsed until a response time increases above a threshold value.

7. The storage control apparatus according to claim 1, wherein
the processor selects commands that are not aligned with data write units in the memory device from among the received commands, and determines the use situation of the cache on the basis of the selected commands.

8. The storage control apparatus according to claim 1, wherein
the processor decides whether or not to execute the second read-modify-write process with respect to each of a plurality of memory devices.

9. The storage control apparatus according to claim 1, wherein
the processor decides whether or not to execute the second read-modify-write process with respect to each RAID group that includes a plurality of memory devices.

10. A non-transitory computer-readable storage medium storing a control program that causes a computer to perform a procedure comprising:
receiving commands of data write into a memory device;
determining a use situation of a cache for a first read-modify-write process by the memory device on the basis of write sizes, a reception frequency, and the number of received commands; and
deciding whether or not to execute a second read-modify-write process by the computer on the basis of the determined use situation,
wherein the determining includes determining the use situation of the cache on the basis of write sizes, a reception frequency, and the number of currently received commands, and information indicating the numbers of commands that increase a response time of the memory device above a threshold value, the numbers of commands each corresponding to a combination of a write size and a reception frequency of commands.

11. A control method comprising:
receiving, by a computer, commands of data write into a memory device;
determining, by the computer, a use situation of a cache for a first read-modify-write process by the memory device on the basis of write sizes, a reception frequency, and the number of received commands; and
deciding, by the computer, whether or not to execute a second read-modify-write process by the computer on the basis of the determined use situation,
wherein the determining includes determining the use situation of the cache on the basis of write sizes, a reception frequency, and the number of currently received commands, and information indicating the numbers of commands that increase a response time of the memory device above a threshold value, the numbers of commands each corresponding to a combination of a write size and a reception frequency of commands.

* * * * *